(12) United States Patent
Park et al.

(10) Patent No.: US 12,189,164 B2
(45) Date of Patent: Jan. 7, 2025

(54) BACKLIGHT UNIT AND DISPLAY DEVICE

(71) Applicant: LG Display Co., Ltd., Seoul (KR)

(72) Inventors: Myungjoon Park, Paju-si (KR); Suhun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/361,735

(22) Filed: Jul. 28, 2023

(65) Prior Publication Data

US 2024/0142692 A1  May 2, 2024

(30) Foreign Application Priority Data

Nov. 1, 2022 (KR) .......... 10-2022-0143678

(51) Int. Cl.
*F21V 8/00* (2006.01)
*G02F 1/1335* (2006.01)
*G02F 1/13357* (2006.01)

(52) U.S. Cl.
CPC ......... *G02B 6/0021* (2013.01); *G02B 6/0023* (2013.01); *G02B 6/0031* (2013.01); *G02B 6/0043* (2013.01); *G02B 6/0046* (2013.01); *G02B 6/0055* (2013.01); *G02B 6/0061* (2013.01); *G02B 6/0068* (2013.01); *G02B 6/0076* (2013.01); *G02F 1/133524* (2013.01); *G02F 1/133605* (2013.01); *G02F 1/133606* (2013.01); *G02B 6/0075* (2013.01)

(58) Field of Classification Search
CPC .. G02B 6/0021; G02B 6/0031; G02B 6/0055; G02F 1/133605; G02F 1/133606
See application file for complete search history.

(56) References Cited

U.S. PATENT DOCUMENTS

| | | | |
|---|---|---|---|
| 2013/0163283 A1 | 6/2013 | Tanaka et al. | |
| 2021/0247052 A1* | 8/2021 | Nakabayashi | .......... F21V 5/045 |
| 2022/0026043 A1* | 1/2022 | Iwakura | ................ G02B 6/0065 |
| 2022/0276429 A1 | 9/2022 | Niikura et al. | |
| 2022/0316682 A1 | 10/2022 | Iwakura | |
| 2023/0116946 A1* | 4/2023 | Nakabayashi | ....... G02B 6/0055 |
| | | | 362/235 |

FOREIGN PATENT DOCUMENTS

CN 209132553 U 7/2019
WO WO 2014006696 A1 1/2014

* cited by examiner

Primary Examiner — Keith G. Delahoussaye
(74) Attorney, Agent, or Firm — Seed IP Law Group LLP

(57) ABSTRACT

Disclosed herein are a backlight unit and a display device including the same. The backlight unit can reduce the number of light sources and can uniformly supply light to a region in which the light sources are disposed and a region in which the light sources are not disposed by arranging a reflective pattern on an upper surface of each light source to emit the light through a side portion of the light source and allowing the emitted light to travel by a light guide portion connecting between the light sources to be emitted above the light guide portion by a reflective layer positioned in a region between the light sources.

12 Claims, 11 Drawing Sheets

*FIG.3*
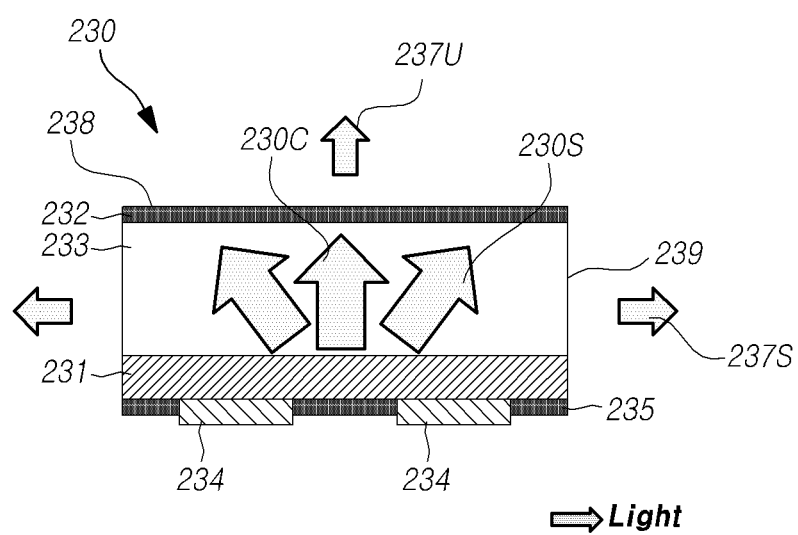
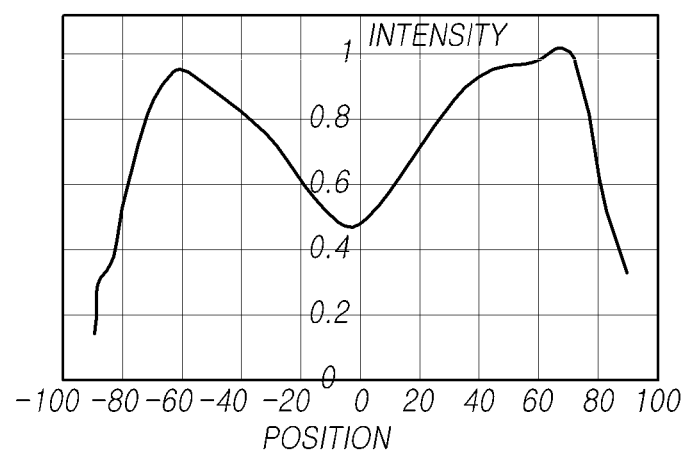

230　250　260

230　250

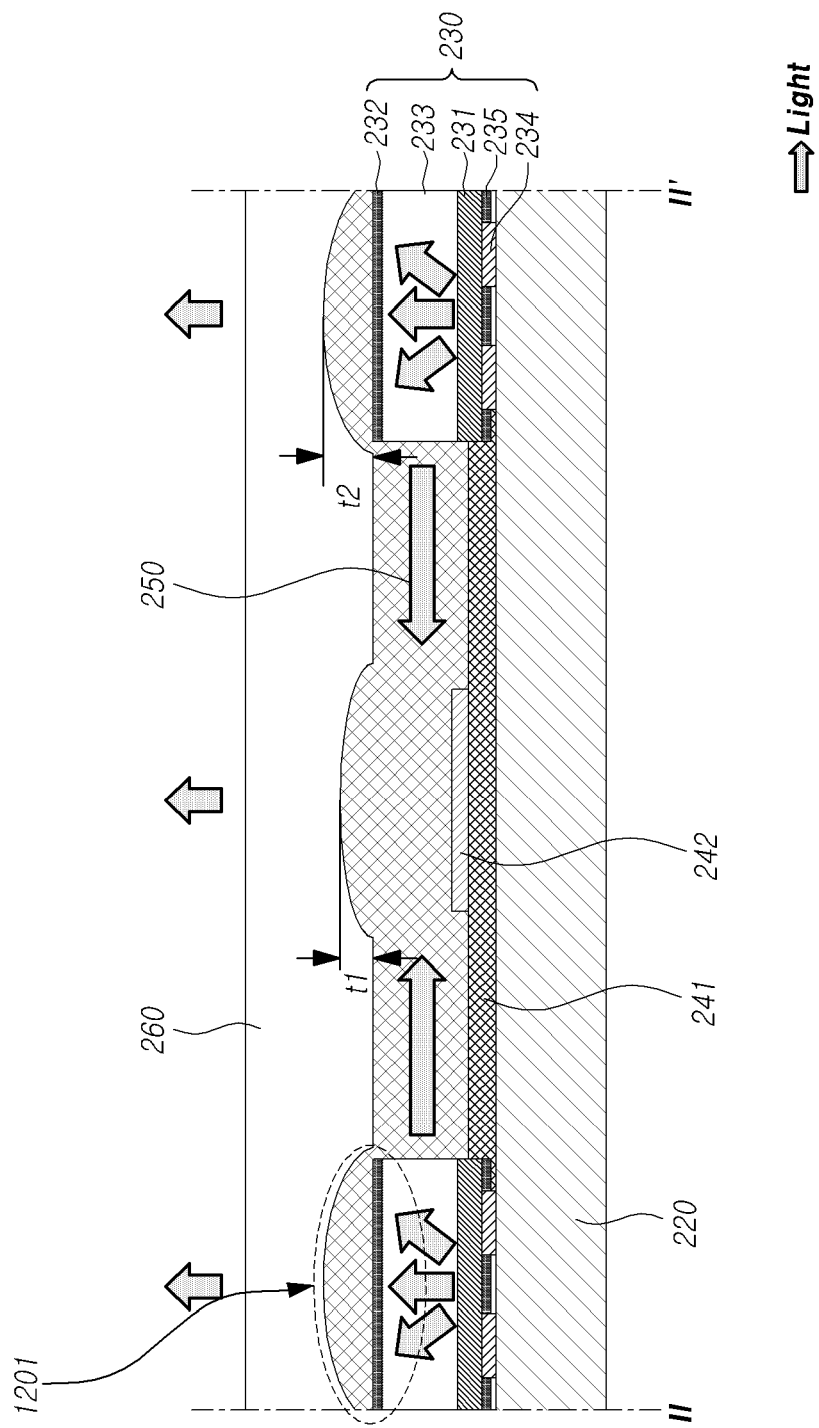

BACKLIGHT UNIT AND DISPLAY DEVICE

CROSS REFERENCE TO RELATED APPLICATION

This application claims priority from Korean Patent Application No. 10-2022-0143678, filed on Nov. 1, 2022, which is hereby incorporated by reference for all purposes as if fully set forth herein.

BACKGROUND

Technical Field

Embodiments of the present disclosure relate to a backlight unit and a display device.

Description of the Related Art

Display devices may include display panels on which a plurality of sub-pixels are disposed, and various driving circuits for driving the plurality of sub-pixels. Brightness of the plurality of sub-pixels is controlled by various driving circuits, and the display panels can display images.

The plurality of sub-pixels may include light-emitting elements to directly emit light. Alternatively, the plurality of sub-pixels may receive light from external components, adjust the amount of light emitted to the outside, and exhibit brightness according to image data.

When the plurality of sub-pixels receive light from external components, the display devices may include separate light source devices for supplying light to the display panels. The overall thickness of the display device may increase due to the light source device, and image quality may be degraded when a thickness of the light source device is reduced.

BRIEF SUMMARY

An aspect of the present disclosure provides measures for improving light efficiency of a backlight unit and uniformity of an image represented by the backlight unit.

In accordance with the embodiments of the present disclosure, light emitted from light sources can be uniformly distributed and light efficiency and image uniformity of a backlight unit can be improved by a light guide portion connecting between side portions of the light sources included in the backlight unit.

In an aspect of the disclosure, a display device includes: a display panel and a backlight unit. The backlight unit including: a substrate; a light emitting structure over the substrate; a first light reflective structure over the light emitting structure; a second light reflective structure over the substrate and extending laterally with respect to the light emitting structure; and a light guide structure over a first region of the second light reflective structure and extending laterally with respect to the light emitting structure, a second region of the second light reflective structure adjacent to the first region being exposed from the light guide structure.

In some implementations, the second light reflective structure includes a plurality of light reflective layers, the plurality of light reflective layers including a first light reflective layer and one or more second light reflective layers each stacked on the first light reflective layer, each second light reflective layer of the one or more second light reflective layers having a smaller area than the first light reflective layer.

In some implementations, a second light reflective layer of the one or more second reflective layers includes a circular shape.

In some implementations, a reflectance value of a second light reflective layer of the one or more second light reflective layers decreases from a central portion to an edge portion of the second light reflective layer.

In some implementations, the one or more second light reflective layers are each further away from the light emitting structure than the first light reflective layer in a lateral direction.

In some implementations, the first reflective layer includes a specular reflection characteristic, and the one or more second reflection layers each includes a diffused reflection characteristic.

In some implementations, the light guide structure includes a first surface distal from the substrate, and the first surface has an inclined shape with a first portion higher than a second portion. The first portion is closer to the light emitting structure than the second portion.

In some implementations, the light emitting structure includes a first light emitting structure and a second light emitting structure. The light guide structure connects between the first light emitting structure and the second light emitting structure. A second light reflective layer of the one or more second light reflective layers is between the first light emitting structure and the second light emitting structure and spaced away from each of the first light emitting structure and the second light emitting structure.

In some implementations, the light emitting structure includes a first light emitting structure, a second light emitting structure, a third light emitting structure, and a fourth light emitting structure. The light guide structure includes a first light guide portion and a second light guide portion, the first light guide portion connecting between the first light emitting structure and the second light emitting structure, the second light guide portion connecting between the third light emitting structure and the fourth light emitting structure, and the first light guide portion and the second light guide portion intersecting with one another at an intersection portion. A second light reflective layer of the one or more second light reflective layers overlaps with the intersection portion.

In some implementations, the light guide structure includes a first surface distal from the substrate. The first surface includes a bump-up portion. The bump-up portion overlaps with the second reflective layer.

In some implementations, the light guide structure is on the first light reflective structure.

In some implementations, the light guide structure encapsulates the first light reflective structure.

In some implementations, the light emit structure includes: a light emitting portion having a first side and a second side opposite to one another; a support portion on the first side of the light emitting portion; and an electrode pad on the second side of the light emitting portion. The first light reflective structure is on the support portion, the support portion between the first reflective structure and the light emitting portion. The second light reflective structure includes a light reflectance greater than that of the first light reflective structure.

In an aspect of the disclosure, a backlight unit includes: a plurality of light sources on a substrate; a first light guide layer disposed on the substrate and between two adjacent light sources among the plurality of light sources, the first light guide layer including a plurality of openings and having a first refractive index; and a second light guide layer disposed on the plurality of light sources and on the first light guide layer, the second light guide layer filling the plurality of openings and having a second refractive index that is smaller than the first refractive index.

In some implementations, the backlight unit further includes a first reflective layer disposed on the substrate and in a region where the first light guide layer or the second light guide layer overlaps.

In some implementations, the backlight unit further includes a second reflective layer disposed on the first reflective layer and in a region where a first portion of the first light guide layer disposed in a first direction intersects a second portion of the first light guide layer disposed in a second direction.

In an aspect of the disclosure, a backlight unit includes: a plurality of light sources on a substrate; a light guide layer disposed on the substrate, the light guide layer including a plurality of openings, and including a first portion disposed in a first direction and a second portion disposed in a second direction intersecting the first direction, one or more openings of the plurality of openings adjacent to the first portion and the second portion; and a plurality of reflective layers disposed in some regions between the substrate and the light guide layer. The plurality of light sources and the plurality of reflective layers are alternately disposed.

In some implementations, an intersection portion between the first portion and the second portion of the light guide layer includes a first thickness value that is different from a second thickness value of a portion of each of the first portion and the second portion of the light guide layer that is immediately adjacent to the intersection portion.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which:

FIG. 3 is a diagram illustrating an example of a structure of a light source included in a backlight unit according to embodiments of the present disclosure;

FIG. 12 is a diagram illustrating an example of a cross-sectional structure of portion II-II' shown in FIG. 11.

DETAILED DESCRIPTION

Figure 1:
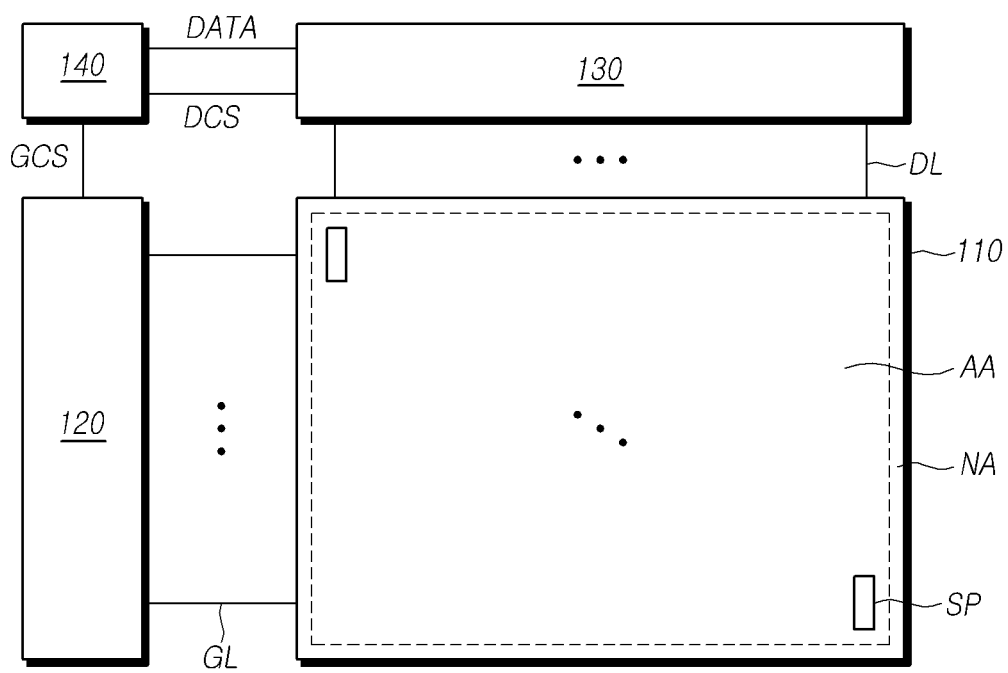
FIG. 1 is a schematic diagram illustrating a configuration included in a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," and, etc., a second element, it should be interpreted that, not only can the first element be directly connected or coupled to or directly contact or overlap the second element, but the first element can also be indirectly connected or coupled to or indirectly in contact or overlap with the second element. That is, a third element can also be interposed between the first and second elements, or the first and second elements can be connected or coupled to, in contact with or overlap, and, etc., each other via a fourth element. Here, the second element may be included in at least one of two or more elements that are connected or coupled to, contact or overlap, and, etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, and, etc.) include a tolerance or error range that may be caused by various factors (e.g., process factors, internal or external impact, noise, and, etc.) even when a relevant description is not specified. Further, the term "may" fully encompasses all the meanings of the term "can."

Hereinafter, various embodiments of the present disclosure will be described in detail with reference to accompanying drawings.

FIG. 1 is a schematic diagram illustrating a configuration included in a display device 100 according to embodiments of the present disclosure.

Referring to FIG. 1, the display device 100 may include a display panel 110, a gate driving circuit 120 for driving the display panel 110, a data driving circuit 130, and a controller 140.

The display panel 110 may include an active area AA in which a plurality of sub-pixels SP are disposed, and a non-active area NA positioned at an outer periphery of the active area AA.

A plurality of gate lines GL and a plurality of data lines DL are disposed in the display panel 110, and the plurality of sub-pixels SP may be positioned in areas where the gate lines GL and the data lines DL intersect.

The gate driving circuit 120 may be controlled by the controller 140 and may sequentially output scan signals to the plurality of gate lines GL disposed in the display panel 110 to control driving timings of the plurality of sub-pixels SP.

The gate driving circuit 120 may include one or more gate driver integrated circuits (GDICs), and according to a driving method, the gate driving circuit 120 may be positioned on only one side or both sides of the display panel 110.

Each GDIC may be connected to a bonding pad of the display panel 110 using a tape automated bonding (TAB) method or a chip-on-glass (COG) method. Alternatively, each GDIC may be implemented in a gate-in-panel (GIP) type IC to be directly disposed in the display panel 110. Alternatively, each GDIC may be integrated and disposed in the display panel 110. Alternatively, each GDIC may be implemented in a chip-on-film (COF) method in which each GDIC is mounted on a film connected to the display panel 110.

The data driving circuit 130 receives image data DATA from the controller 140 and converts the received image data DATA into an analog data voltage. In addition, the data driving circuit 130 outputs the data voltage to each data line DL according to a timing when the scan signal is applied through the gate line GL, thereby allowing each sub-pixel SP to express brightness according to the image data DATA.

The data driving circuit 130 may include one or more source driver integrated circuits (SDICs).

Each SDIC may include a shift register, a latch circuit, a digital-to-analog converter, and an output buffer.

Each SDIC may be connected to the bonding pad of the display panel 110 using a TAB method or a COG method. Alternatively, each SDIC may be directly disposed in the display panel 110. Alternatively, each SDIC may be integrated and disposed in the display panel 110. Alternatively, each SDIC may be implemented in a COF method. In this case, each SDIC may be mounted on a film connected to the display panel 110 and electrically connected to the display panel 110 through lines on the film.

The controller 140 may supply various control signals to the gate driving circuit 120 and the data driving circuit 130 to control operations of the gate driving circuit 120 and the data driving circuit 130.

The controller 140 may be mounted on a printed circuit board or a flexible printed circuit and electrically connected to the gate driving circuit 120 and the data driving circuit 130 through the printed circuit board or the flexible printed circuit.

The controller 140 may control the gate driving circuit 120 to output a scan signal according to a timing set in each frame, convert image data DATA received from an external device into a data signal format used in the data driving circuit 130, and output the converted image data DATA to the data driving circuit 130.

The controller 140 receives, together with the image data DATA, various timing signals including a vertical synchronization signal VSYNC, a horizontal synchronization signal HSYNC, an input data enable signal DE, and a clock signal CLK from an external component (e.g., a host system).

The controller 140 may generate the various control signals using the various timing signals received from the external component and output the generated various control signals to the gate driving circuit 120 and the data driving circuit 130.

As one example, in order to control the gate driving circuit 120, the controller 140 outputs various gate control signals GCS including a gate start pulse GSP, a gate shift clock GSC, and a gate output enable signal GOE.

The gate start pulse GSP controls operation start timings of one or more GDICs constituting the gate driving circuit 120. The gate shift clock GSC is a clock signal commonly input to the one or more GDICs and controls a shift timing of the scan signal. The gate output enable signal GOE specifies timing information of the one or more GDICs.

In addition, in order to control the data driving circuit 130, the controller 140 outputs various data control signals DCS including a source start pulse SSP, a source sampling clock SSC, and a source output enable signal SOE.

The source start pulse SSP controls data sampling start timings of the one or more SDICs constituting the data driving circuit 130. The source sampling clock SSC is a clock signal for controlling a sampling timing of data in each SDIC. The source output enable signal SOE controls an output timing of the data driving circuit 130.

The display device 100 may further include a power management IC which supplies various voltages or currents to the display panel 110, the gate driving circuit 120, and the data driving circuit 130 or controls various voltages or various currents which are to be supplied.

Each sub-pixel SP may be a region where the gate line GL and the data line DL intersect, and at least one circuit element may be disposed in each sub-pixel SP. In addition, according to the type of the display device 100, a light-emitting element which emits light, or a liquid crystal layer may be disposed in each sub-pixel SP.

As one example, when the display device 100 is a liquid crystal display device, a liquid crystal layer may be disposed in each sub-pixel SP. The display device 100 may include a backlight unit for supplying light to the display panel 110. The backlight unit may include a light-emitting element and various optical elements.

Figure 2:
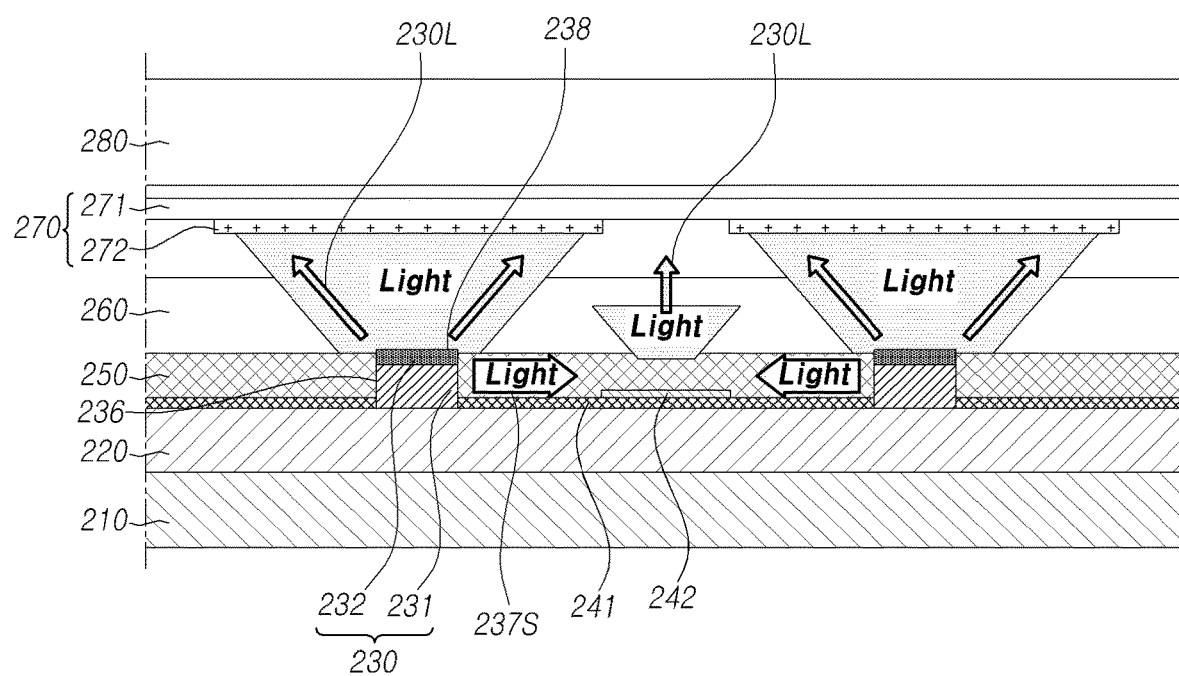
FIG. 2 is a diagram illustrating an example of a cross-sectional structure of a backlight unit included in a display device according to embodiments of the present disclosure.

FIG. 2 is a diagram illustrating an example of a cross-sectional structure of a backlight unit included in the display device 100 according to embodiments of the present disclosure.

Referring to FIG. 2, the backlight unit may include a cover bottom 210 accommodating various optical elements and sheets.

A substrate 220 on which a light source 230 is mounted may be disposed on the cover bottom 210. The substrate 220 may be, for example, a printed circuit. The substrate 220 may be flexible, and in some cases, the substrate 220 may not be flexible. In some cases, the substrate 220 may be made of glass, plastic, a polymer or other suitable support. The substrate 220 and cover bottom 210 can each be any one of transparent, reflective, opaque, light absorbing, light refractive or have other properties relative to the light emitted by the light source 231. The cover bottom 210 is not required in all embodiments and is optional.

A plurality of light sources 230 may be disposed on the substrate 220. The light source 230 may be, for example, a light-emitting diode (LED), and in some cases, the light source 230 may be a mini LED or a micro LED (μLED).

Each of the plurality of light sources 230 may include, for example, a light-emitting portion 231 which emits light and a reflective pattern 232 positioned on an upper surface of the light-emitting portion 231. The reflective pattern 232 may be, for example, a distributed Bragg reflector (DBR), but the present disclosure is not limited thereto. The light emitting portion 231 emits light in all directions, namely 360°. The light can then be directed or reflect from one or more of the emitted angles as it is emitted or it can be blocked as explained herein.

A portion of the light emitted from the light-emitting portion 231 may pass through the reflective pattern 232. The light passing through the reflective pattern 232 may be emitted above the light source 230. At least a portion of the light emitted from the light-emitting portion 231 may be reflected by the reflective pattern 232. The light reflected by the reflective pattern 232 may be emitted from a side portion or side surface 233 of the light source 230 to a side direction 237S. The term "reflective pattern" is used in the broadest sense to include refractive pattern, a partial mirror pattern, a diffraction grating, a waveguide and the like. For example, a Bragg reflector can be considered a waveguide or a refractive pattern.

A light guide portion 250 may be positioned on the side portion 236 of the light source 230. The light guide portion 250 may be referred to as a "first light guide layer."

The light guide portion 250 may be disposed on at least a partial region on the substrate 220. For example, the light guide portion 250 may be disposed on the substrate 220 and connect or communicate between adjacent light sources 230. The light guide portion 250 may be disposed in contact with the side portion 236 of the light source 230. The light guide portion 250 may be disposed to surround the light source 230.

The light guide portion 250 may be made of, for example, a transparent material having a high refractive index, e.g., 1.5 or more. The light guide portion 250 may guide light emitted from a side surface 236 of the light source 230. The light emitted from the light source 230 may travel to a region in which the light source 230 is not disposed through the light guide portion 250.

A first reflective layer 241 may be positioned between the light guide portion 250 and the substrate 220. A second reflective layer 242 may be positioned in at least a partial region between the light guide portion 250 and the first reflective layer 241.

The first reflective layer 241 may be made of, for example, a material having a specular reflection characteristic. The light emitted from the light source 230 may be reflected by the first reflective layer 241 inside the light guide portion 250 and may travel to a region between the light sources 230.

The second reflective layer 242 may be made of, for example, a material having a diffused reflection characteristic. For example, the second reflective layer 242 may be positioned in a position between the light sources 230 and may be positioned in a position with a large distance from the two adjacent light source 230 connected by the respective light guide portion 250.

The light traveling through the region between the light sources 230 by the light guide portion 250 and the first reflective layer 241 may be diffusely reflected by the second reflective layer 242. The light reaching the second reflective layer 242 may be emitted above the light guide portion 250. Since the light emitted from the light source 230 by the light guide portion 250, the first reflective layer 241, and the second reflective layer 242 is supplied above the light source 230 and the region between the light sources 230, the light may be uniformly supplied to the region in which the light source 230 is positioned and a region in which the light source 230 is not positioned.

A light source protection portion 260 may be disposed on the light source 230 and the light guide portion 250. The light source protection portion 260 may also be referred to as a "second light guide layer," for descriptive purposes.

The light source protection portion 260 may be made of, for example, a transparent material having a refractive index that is smaller than that of the light guide portion 250, e.g., 1.4 or less. The light source protection portion 260 may be made of resin or polyethylene terephthalate (PET), but the present disclosure is not limited thereto.

The light source protection portion 260 may protect the light source 230. The light source protection portion 260 may be disposed to surround at least a portion of the light source 230.

Since the light guide portion 250 may be disposed to surround the side surface 236 of the light source 230, the light source protection portion 260 may be disposed to be spaced apart from the side surface 236 of the light source 230 by the light guide portion 250. The light source protection portion 260 may be disposed in contact with an upper most surface 238 of the light source 230.

Since the refractive index of the light source protection portion 260 is smaller than that of the light guide portion 250, light guided by the light guide portion 250 may not be emitted above the light guide portion 250. The light passing through the reflective pattern 232 of the light source 230 or the light diffusely reflected by the second reflective layer 242 and emitted to the light guide portion 250 may be guided through the light source protection portion 260 to spread out uniformly.

A light path control film 270 may be disposed on the light source protection portion 260. The light travels on an expanding path from each of layers 232 and 242 towards the light path control film 270 as shown by arrows 230L in general shape of an expanding cone shape as shown in FIG. 2.

The light path control film 270 may include, for example, a substrate film 271 and a plurality of light path control patterns 272. The substrate film 271 may be formed of, for example, a transparent film, but the present disclosure is not limited thereto. The light path control pattern 272 may be made of a material having high reflectivity, for example, $TiO_2$, but the present disclosure is not limited thereto.

The light path control pattern 272 may be disposed on at least one of upper and lower surfaces of the substrate film 271, with respect to the light source protection portion 260. Each of the plurality of light path control patterns 272 may be positioned in a region corresponding to a region in which one of the plurality of light sources 230 is positioned.

The light path control pattern 272 may reflect at least a portion of the light emitted from the light source 230. Some of the light reaching the light path control pattern 272 may pass through the light path control pattern 272. The light path control pattern 272 may be disposed on the light source 230 and may uniformly distribute the light in a region where an intensity of the light emitted from the light source 230 is the strongest.

An area of the light path control pattern 272 may be greater than an area of the light-emitting portion 231 or an area of the reflective pattern 232 positioned on the light-emitting portion 231. A reflectance of the light path control pattern 272 may be greater than, for example, a reflectance of the reflective pattern 232. In some cases, the reflectance of the light path control pattern 272 may be less than a reflectance of the reflective pattern 232.

An optical sheet 280, such as a diffusion plate, a phosphor sheet, or a prism sheet, may be disposed on the light path control film 270.

Since the light guide portion 250 having a refractive index that is greater than that of the light source protection portion 260 is disposed between adjacent light sources 230 to guide the light, the light emitted from the light source 230 may be uniformly supplied by the light guide portion 250. Each of the plurality of light sources 230 may have a structure for easily emitting light to a side direction 237S.

FIG. 3 is a diagram illustrating an example of a structure of the light source 230 included in a backlight unit according to embodiments of the present disclosure.

Referring to FIG. 3, the light source 230 may include a light-emitting portion 231 which emits light. A support 233 may be positioned on the light-emitting portion 231. The support 233 may be made of a transparent material, for example, transparent sapphire, but the present disclosure is not limited thereto.

The reflective pattern 232 may be disposed on the support 233. An electrode pad 234 may be disposed below the light-emitting portion 231. A light blocking pattern 235 may be disposed in at least a portion of a region where the electrode pad 234 is not disposed below the light-emitting portion 231. The light blocking pattern 235 may be made of, for example, the same material as the reflective pattern 232.

Alternatively or additionally, the light blocking pattern 235 may be formed of a material having a reflectance different from that of the reflective pattern 232. As one example, a reflectance of the light blocking pattern 235 may be greater than that of the reflective pattern 232.

For example, the light source 230 may be manufactured by arranging the light-emitting portion 231, the electrode pad 234, and the light blocking pattern 235 on the support 233 and then flipping the arrangement over to arrange the reflective pattern 232 thereon.

Since the transparent support 233 is positioned between the light-emitting portion 231 and the reflective pattern 232 and the light blocking pattern 235 is disposed on a rear surface of the light-emitting portion 231, a ratio of the light emitted from the light-emitting portion 231 to the side portion of the light source 230 may be high. A portion of the light emitted from the light-emitting portion 231 may pass through the reflective pattern 232 to be supplied above the light source 230 in up direction 237U. Most of the light emitted from the light-emitting portion 231 may be reflected by the reflective pattern 232 and the light blocking pattern 235 and may be emitted to the side direction 237S of the light source 230 through a side surface 239 of the transparent support 233 that is part of the side surface 236 of the light source 230.

The light 230L may include light 230C at the central portion of the light source 230 and light 230S at a position spaced apart from a central portion of the light source 230. An intensity of the light 230S at a position spaced apart from a central portion of the light source 230 may be greater than an intensity of the light 230C at the central portion of the light source 230. Therefore, it is possible to reduce an intensity deviation of the light between the region in which the light source 230 is disposed and other regions. In addition, the light emitted from the light source 230 may be emitted through the side direction 237S of the light source 230 to be uniformly supplied to a region in which the light source 230 is not disposed.

Since the light guide portion 250, the first reflective layer 241, and the second reflective layer 242 are disposed in the region between the light sources 230, the light spreading out in the side direction 237S from the side surface 236 of the light source 230 may be uniformly supplied upward.

Figure 4:
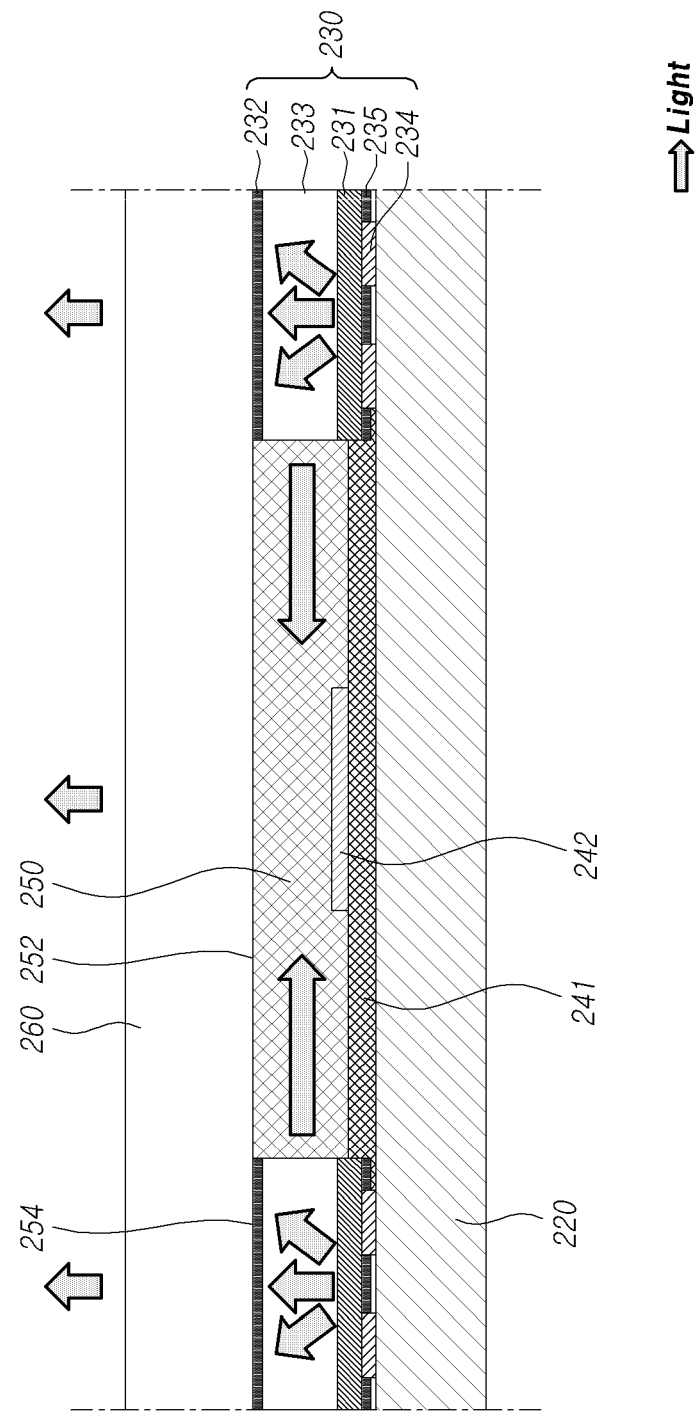
FIGS. 4 and 5 are diagrams illustrating other examples of a cross-sectional structure of a backlight unit according to embodiments of the present disclosure.
Figure 5:
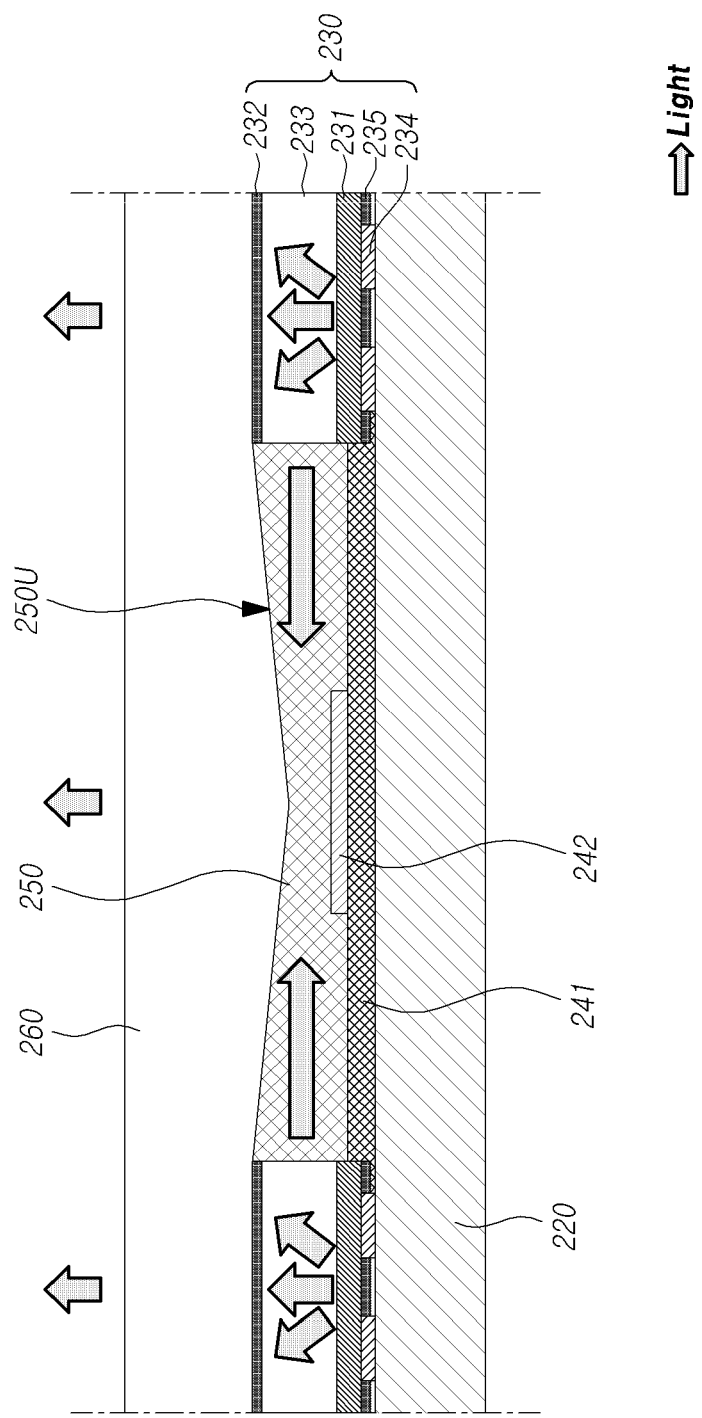
Figure 6:
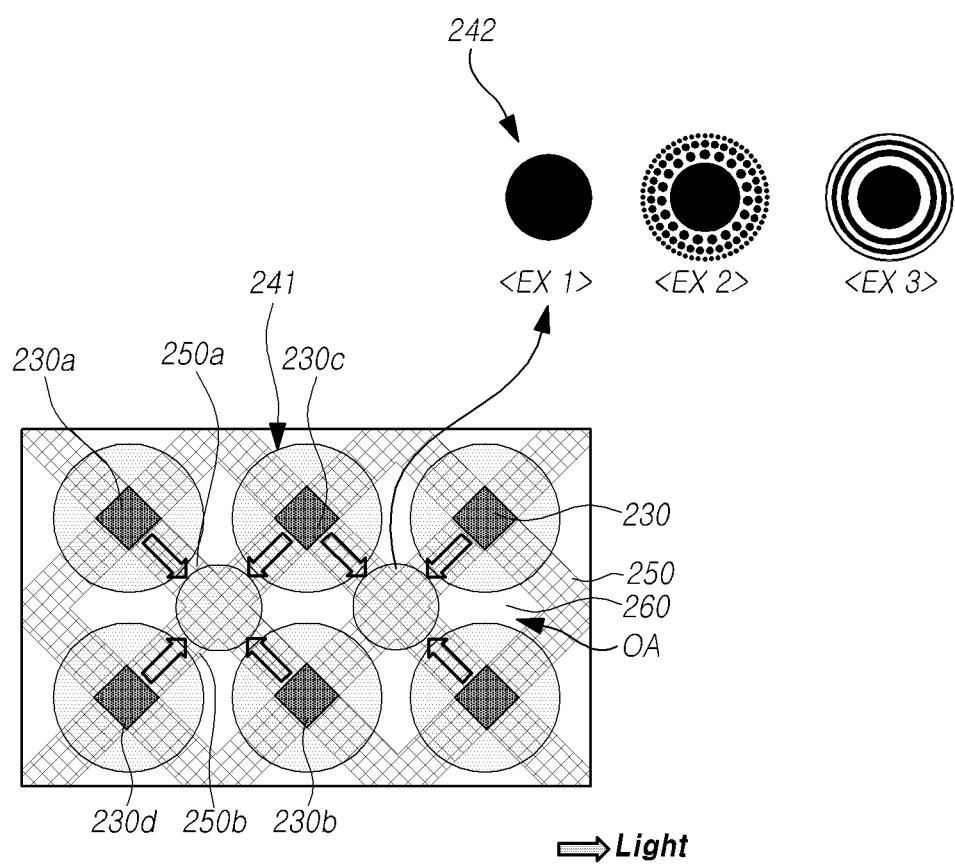
FIGS. 6 and 7 are diagrams illustrating examples of a planar structure of a backlight unit according to embodiments of the present disclosure.
Figure 7:
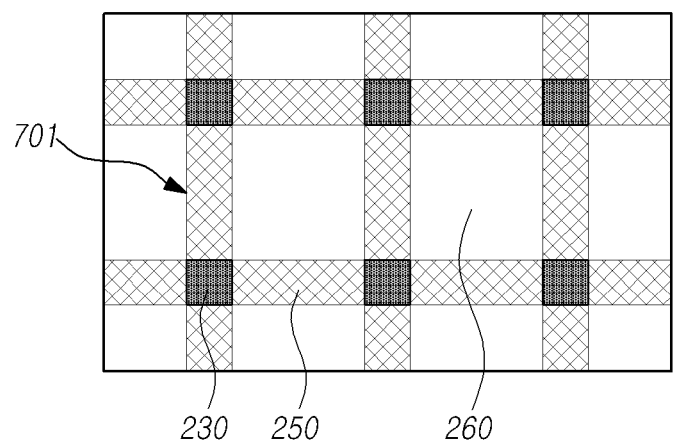
Figure 8:
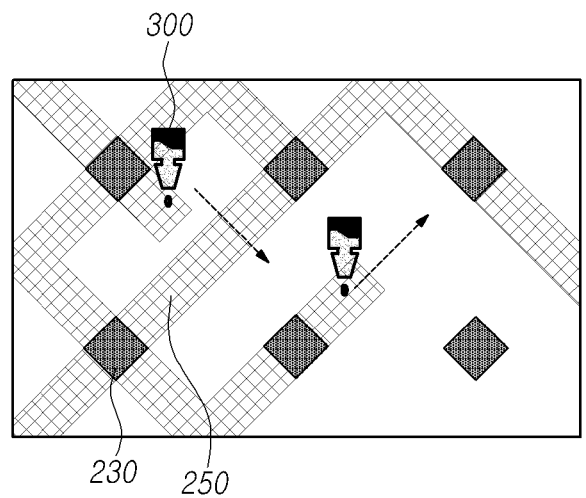
FIG. 8 is a diagram illustrating an example of a process of arranging a light guide portion in a backlight unit according to embodiments of the present disclosure.

FIGS. 4 and 5 are diagrams illustrating other examples of a cross-sectional structure of a backlight unit according to embodiments of the present disclosure. FIGS. 6 and 7 are diagrams illustrating examples of a planar structure of a backlight unit according to embodiments of the present disclosure. FIG. 8 is a diagram illustrating an example of a process of arranging the light guide portion 250 in the backlight unit according to embodiments of the present disclosure.

Referring to FIG. 4, the plurality of light sources 230 may be disposed on the substrate 220.

The light guide portion 250 may be disposed between the light sources 230. The light guide portion 250 may connect between the light sources 230 and may guide the emitted light emitted in the side direction 237S from the side surface 236 of the light source 230.

An upper surface 252 of the light guide portion 250 may be positioned no lower than, for example, an upper most surface 238 of the light source 230. The upper surface 252 of the light guide portion 250 may be positioned no lower than the reflective pattern 232 positioned atop the light source 230. In some cases, the upper end of the light guide portion 250 may be positioned no lower than an upper surface 254 of the support 233 included in the light source 230.

The light reflected by the reflective pattern 232 of the light source 230 and emitted to the side portion of the support 233 enters the light guide portion 250, and the light may be totally reflected to be guided to the region in which the light source 230 is not disposed.

The light guided to the region in which the light source 230 is not disposed may be reflected by the second reflective layer 242 on the first reflective layer 241 and may be emitted above the corresponding region.

The light guide portion 250 may have a constant thickness between the light sources 230. In some cases, the light guide portion 250 may have a thickness that varies according to a region.

As one example, referring to FIG. 5, the thickness of the light guide portion 250 may gradually decrease as the distance from the light source 230 increases. Since the thickness of the light guide portion 250 gradually decreases, an upper surface 250U of the light guide portion 250 may have an inclined shape, inclined from the adjacent light source 230. For example, a first portion of the upper surface 250U that is closer to the light emitting structure 230 is higher than a second portion that is farther away from the light emitting structure 230.

Since the upper surface of the light guide portion 250 is inclined, the amount of the light that reaches the second reflective layer 242 positioned below the light guide portion 250 between the light sources 230 may increase.

In the region between the light sources 230, the amount of the light emitted above the corresponding region may increase. Uniformity of the light emitted above the region in which the light source 230 is disposed and the region in which the light source 230 is not disposed may be improved.

The light guide portion 250 disposed to connect between the light sources 230 may have, for example, a planar structure in the form of a mesh including an opening OA.

As an example, referring to FIG. 6, a plurality of light sources 230 may be disposed, and the light guide portion 250 or a plurality of light guide portions 250 may be disposed between adjacent light sources 230 among the plurality of light sources 230. The light guide portion 250 may be disposed to connect between the light sources 230 and may not be disposed in other regions. The region in which the light guide portion 250 is not disposed may be referred to as the opening OA, and the opening OA may be filled with the light source protection portion 260 disposed on the light source 230 and the light guide portion 250. As mentioned herein, the light source protection portion 260 is also referred to as a second light guide layer. The second light guide layer 260 has a second refractive index that is smaller than the first refractive index of the light guide portion 250.

The light guide portion 250 may be disposed to connect between the light sources 230 and may intersect with light guide portions 250 which connect different light sources 230.

As one example, referring to the example shown in FIG. 6, a first light guide portion 250a connecting between a first light source 230a and a second light source 230b may be disposed. A second light guide portion 250b connecting between a third light source 230c and a fourth light source 230d may be disposed.

The first light guide portion 250a and the second light guide portion 250b may intersect. The first reflective layer 241 may be disposed between the first light guide portion 250a and the substrate 220 and between the second light guide portion 250b and the substrate 220. The second reflective layer 242 may be disposed in a region where the first light guide portion 250a and the second light guide portion 250b intersect on the first reflective layer 241.

The second reflective layer 242 may be disposed in at least a partial region of the region where the first light guide portion 250a and the second light guide portion 250b intersect. In some cases, a portion of the second reflective layer 242 may be positioned outside the region where the first light guide portion 250a and the second light guide portion 250b intersect.

A structure in which the light source 230 or the second reflective layer 242 is disposed in the region where the light guide portions 250 intersect may be provided. The light source 230 and the second reflective layer 242 may be alternately disposed in the region where the light guide portions 250 intersect.

The second reflective layer 242 may be made of a material capable of diffusely reflecting light for reaching a corresponding region in the region between the light sources 230 and may be formed in various structures. As one example, the second reflective layer 242 may be disposed in a circular shape as in the example shown in <EX 1> of FIG. 6, and the second reflective layer 242 may be disposed in a form in which the reflectance decreases from a central portion to an edge as in the example shown in <EX 2> or <EX 3>.

Due to the structure in which the reflective pattern 232 is positioned atop the light source 230 to allow the light to be emitted to the side portion of the light source 230, the arrangement structure of the light guide portion 250 that allows the light emitted to the side portion of the light source 230 to travel to the region in which the light source 230 is not disposed, and the structure of the second reflective layer 242 positioned at the intersection of the light guide portions 250, the light may be uniformly supplied to the region in which the light source 230 is disposed and the region in which the light source 230 is not disposed. This can improve light efficiency and image quality exhibited by the backlight unit.

In addition, the mesh shape of the light guide portion 250 disposed to connect between the light sources 230 may be various.

As one example, as in the example shown in FIG. 6, the light guide portion 250 may be disposed to connect between the light sources 230 in a diagonal line direction. For example, a second reflective layer 242 is adjacent to four light sources 230.

Alternatively or additionally, as in the example shown in FIG. 7, the light guide portion 250 may be disposed to connect between the light sources 230 in a vertical line direction and a horizontal line direction. For example, a second reflective layer 242 is adjacent to two light sources 230.

The light guide portion 250 may be disposed to connect between adjacent light sources 230, and the first reflective layer 241 may be disposed below the light guide portion 250. The second reflective layer 242 may be disposed in a partial region between the light guide portion 250 and the first reflective layer 241. The second reflective layer 242 may be positioned in, for example, a region which is farthest away from the light sources 230 in the light guide portion 250.

As one example, in the example shown in FIG. 7, the second reflective layer 242 may be positioned at a central point of the region between the light sources 230 as indicated by 701.

Since the light guide portion 250 is disposed in the vertical line direction and the horizontal line direction and the second reflective layer 242 is disposed below the light guide portion 250 and between two adjacent light sources 230 connected by the light guide portion 250, the number of regions in which the second reflective layer 242 is disposed may increase. In a state in which the number of regions in which the light source 230 is disposed is fixed, the number of regions in which the second reflective layer 242 is disposed increases, and thus a structure in which the light may spread out uniformly may be provided.

The light guide portion 250 connecting between the light sources 230 may be disposed by, for example, a dispensing method.

Referring to FIG. 8, a process in which the light source 230 is disposed on the substrate 220 and the light guide portions 250 are disposed between the light sources 230 by a dispensing device 300 may be performed.

The light guide portions 250 may be disposed to connect between the light sources 230 by the dispensing device 300 in the region in which the light source 230 is not disposed.

The dispensing device 300 may arrange the light guide portions 250 with a predetermined thickness or with a thickness that varies gradually. According to the process, the dispensing device 300 may arrange the light guide portions 250 to prevent thicknesses thereof from increasing in the region where the light guide portions 250 intersect. For convenience in the process, the dispensing device 300 may arrange the light guide portions 250 to overlap with each other such that their thicknesses increase.

In addition, according to the process, the dispensing device 300 may arrange the light guide portion 250 not to be positioned on the light source 230 or arrange the light guide portion 250 to be positioned in at least a partial region on the light source 230.

After the light guide portion 250 is disposed, the light source protection portion 260 may be entirely disposed on the light source 230 and the light guide portion 250. The light source protection portion 260 may be disposed to fill a region in which the light guide portion 250 is not disposed.

Through the above-described process, the light guide portions 250 connecting between the light sources 230 may be easily disposed.

In addition, in some cases, portions of the light guide portions 250 may overlap with each other so that the light guide portion 250 may be disposed to be wide or thick in some regions.

Figure 9:
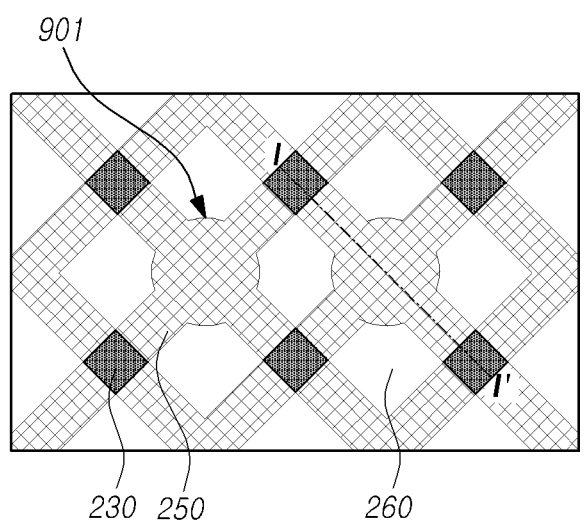
FIG. 9 is a diagram illustrating another example of a planar structure of a backlight unit according to embodiments of the present disclosure.
Figure 10:
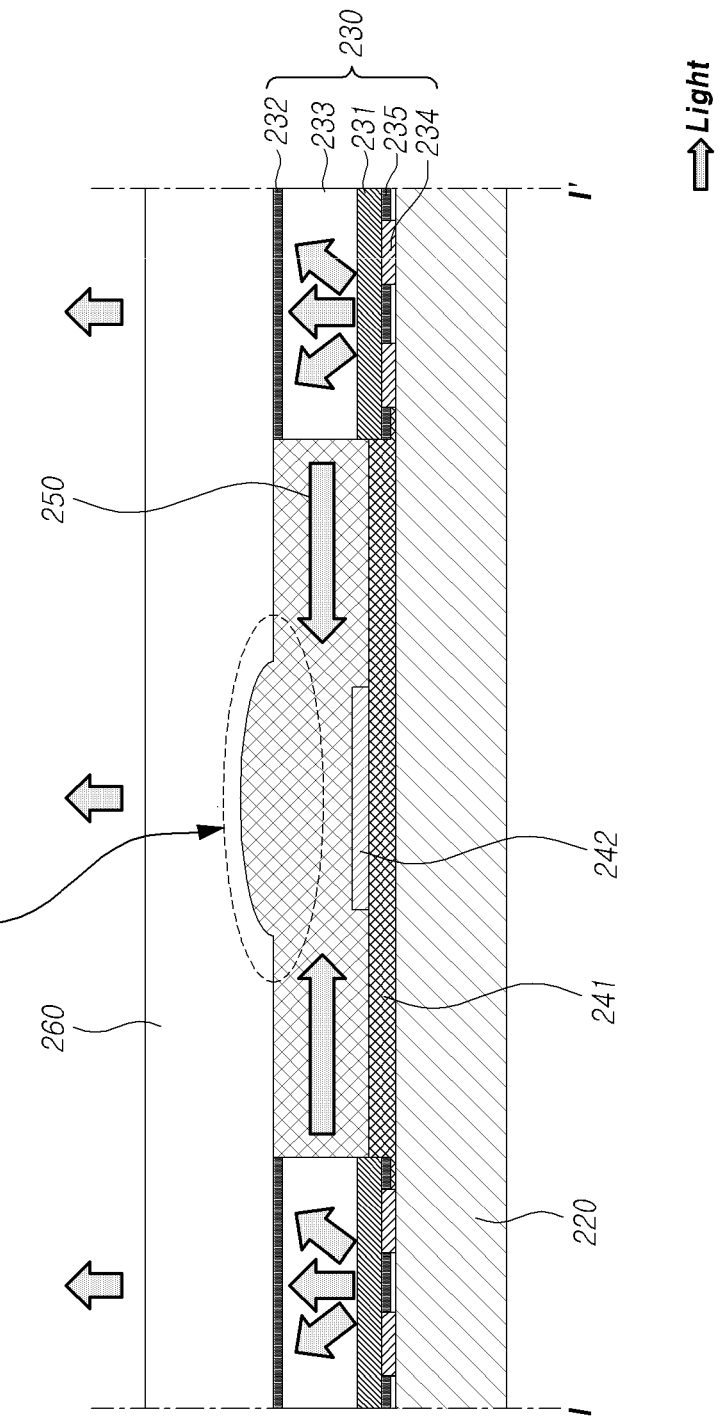
FIG. 10 is a diagram illustrating an example of a cross-sectional structure of portion I-I' shown in FIG. 9.

FIG. 9 is a diagram illustrating another example of a planar structure of a backlight unit according to embodiments of the present disclosure. FIG. 10 is a diagram illustrating an example of a cross-sectional structure of portion I-I' shown in FIG. 9.

Referring to FIGS. 9 and 10, the light guide portions 250 may be disposed between the light sources 230 in a dispensing process. The light guide portions 250 connecting different light sources 230 may intersect.

In a region where the light guide portions 250 intersect, only any one of the light guide portions 250 may be disposed in the dispensing process. In this case, a thickness of the light guide portion 250 in the region where the light guide portions 250 intersect may be the same as or similar to that of a light guide portion 250 in another region.

Alternatively or additionally, in the region where the light guide portions 250 intersect, both the light guide portions 250 may be disposed in the dispensing process. As one example, after the process of disposing one light guide portion 250, a light guide portion 250 may be disposed to intersect the corresponding light guide portion 250, and a light guide portion 250 may be disposed twice in the intersection region.

Since the light guide portions 250 are disposed to overlap in the region where the light guide portions 250 intersect, the light guide portion 250 may be disposed to spread out laterally in the corresponding region, as indicated by 901 shown in FIG. 9.

In addition, in a bump-up region 1001 shown in FIG. 10, a thickness of the light guide portion 250 in the region where the light guide portions 250 intersect may be greater than that of the light guide portion 250 in another region. An amount of material dispensed may be adjusted so that the thickness of the light guide portion 250 in the region where the light guide portions 250 intersect is, for example, two times a thickness of the light guide portion 250 in another portion or two times or less the thickness thereof. In some implementations, the bump-up region 1001 overlaps the second reflective layer 242.

An upper surface of the light guide portion 250 may have a convex shape in the bump-up region 1001 where the light guide portions 250 intersect.

Since the light guide portions 250 are disposed to overlap in the region where the light guide portions 250 intersect, the dispensing process may be performed without interruption so that process convenience can be improved.

The region where the light guide portions 250 intersect may be a region in which the second reflective layer 242 is disposed.

An upper surface of the light guide portion 250, the bump-up region 1001, positioned on the region in which the second reflective layer 242 is disposed may have a convex shape. Thus, the light diffusely reflected by the second reflective layer 242 and emitted above the light guide portion 250 may be easily emitted due to the convex shape of the upper surface of the light guide portion 250. Light emission efficiency in a corresponding region can be improved by the overlapping structure of the second reflective layer 242 and the convex-shaped light guide portion 250.

In addition, in some cases, the dispensing process may be performed without interruption even in the region in which the light source 230 is disposed.

Figure 11:
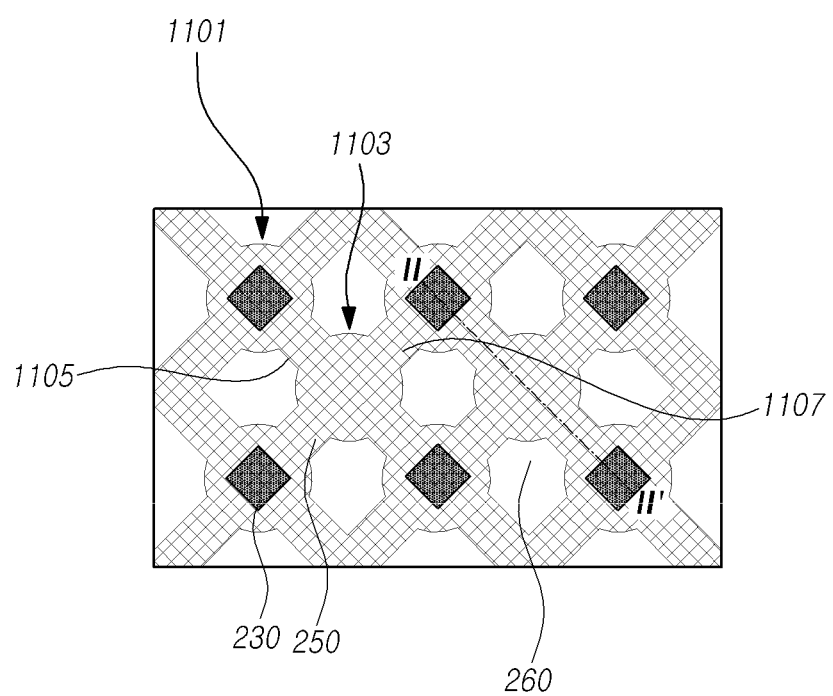
FIG. 11 is a diagram illustrating another example of a planar structure of a backlight unit according to embodiments of the present disclosure.

FIG. 11 is a diagram illustrating another example of a planar structure of a backlight unit according to embodiments of the present disclosure. FIG. 12 is a diagram illustrating an example of a cross-sectional structure of portion II-II' shown in FIG. 11.

Referring to FIGS. 11 and 12, light guide portions 250 may be disposed to connect between light sources 230.

In a process of arranging the light guide portions 250, the light guide portion 250 may be disposed in a region in which the light source 230 is positioned or a region in which the light guide portions 250 intersect without stopping dispensing.

An amount of a material dispensed in the region in which the light source 230 is positioned and the region in which the light guide portions 250 intersect may be reduced or the same amount of a material as in other regions may be dispensed.

The light guide portions 250 may be disposed to overlap in the region in which the light guide portions 250 intersect. The light guide portions 250 may be disposed to be wide and thick in the region in which the light guide portions 250 intersect.

The light guide portion 250 may be disposed to overlap at least a portion of the light source 230 in the region in which the light source 230 is positioned.

As in a portion indicated by 1101 shown in FIG. 11, the light guide portion 250 may be disposed to be wide in the region in which the light source 230 is positioned. In addition, as shown in a portion indicated by 1201 shown in FIG. 12, since the light guide portion 250 is disposed on an upper surface of the light source 230, the light guide portion 250 in a corresponding region may be positioned to be higher than a light guide portion 250 positioned in other regions. In some implementations, the light guide portion 250 encapsulates the light source 230 in that the light guide portion 250 covers or is adjacent to the upper most surface 238 of the light source 230 and covers or is adjacent to at least the upper portion of the side surface of the light source 230, e.g., the side surface 239 of the transparent support 233.

The upper surface and a side surface of the light source 230 may be surrounded by the light guide portion 250. The light guide portion 250 may be disposed in a convex shape on the upper surface of the light source 230.

A thickness of the light guide portion 250 disposed on the light source 230 may be similar to or different from a thickness of a protruding portion of a light guide portion 250 positioned in the region where the light guide portions 250 intersect.

For example, a thickness t2 of the light guide portion 250 positioned on the light source 230 may be greater than a thickness t1 of the protruding portion of the light guide portion 250 in the region where the light guide portions 250 intersect. The thickness t1 of the protruding portion or bump-up portion 1001 at an intersection portion 1103 between the first portion 1105 and the second portion 1107 (FIG. 11) of the light guide layer 250 reflects that a first thickness value of the light guide portion 250 at the intersection portion 1103 is greater than a second thickness value of a portion of each of the first portion 1105 and the second portion 1107 of the light guide layer that is immediately adjacent to the intersection portion 1103. The light guide portions 250 may be disposed in the same dispensing process, and since a degree of spread of the light guide portion 250 disposed on the light source 230 may be smaller than a degree of spread of the intersection region of the light guide portions 250, the thickness of the light guide portion 250 positioned on the light source 230 may be greater than the thickness of the light guide portion 250 protruding from the intersection region of the light guide portions 250.

Since the dispensing process is continuously performed in the region in which the light source 230 is positioned and the region where the light guide portions 250 intersect, process convenience can be improved.

Since an upper surface of the light guide portion 250 is disposed on the second reflective layer 242 in a convex shape in the region where the light guide portions 250 intersect, light emission efficiency can be improved in a corresponding region.

Since the light guide portion 250 is disposed on the light source 230 in a convex shape, light emission efficiency of light passing through the reflective pattern 232 of an upper portion of the light source 230 can be improved.

Since the light guide portion 250 is disposed to surround the upper surface and the side surface of the light source 230, the light source 230 may be surrounded by the light guide portion 250.

In this case, a light source protection portion 260 may not be disposed on the light guide portion 250. An air layer having a refractive index that is lower than that of the light guide portion 250 may be provided on the light guide portion 250.

Since the light guide portion 250 is disposed to surround the upper surface and the side surface of the light source 230, the light guide portion 25 may simultaneously provide a function of protecting the light source 230 and a function of guiding light emitted to a side portion of the light source 230.

In addition, since the light guide portion 250 is made of a material having a high refractive index, the light emitted to the side portion of the light source 230 may be totally reflected within the light guide portion 250 and may be emitted above the light guide portion 250 in the region where the light guide portions 250 intersect. Since the light emitted from the light source 230 is uniformly supplied to the region in which the light source 230 is disposed and a region in which the light source 230 is not disposed and is emitted above the light guide portion 250, light efficiency and image quality according to the region can be improved.

An effect in which light sources 230 are disposed to correspond to the number of regions where the light guide portions 250 intersect may be provided.

The following is a brief description of the above-described embodiments of the present disclosure.

The display device 100 according to the embodiments of the present disclosure may include the display panel 110, and the backlight unit for supplying light to the display panel 110, and the backlight unit may include the plurality of light sources 230 which are disposed on the substrate 220 and each of which includes the reflective pattern 232 positioned on one of the light sources 230, the plurality of light guide portions 250 disposed to connect between side portions of two adjacent light sources 230 among the plurality of light sources 230, the first reflective layer 241 disposed between the substrate 220 and the plurality of light guide portions 250, and the second reflective layer 242 disposed in a partial region between the first reflective layer 241 and the plurality of light guide portions 250.

The side portion of each of the plurality of light sources 230 may be surrounded by at least one of the plurality of light guide portions 250.

The upper end of each of the plurality of light guide portions 250 may be positioned no lower than the upper end of the side portion of each of the plurality of light sources 230.

The thickness of each of the plurality of light guide portions 250 may decrease as the distance from the side portion of each of the plurality of light sources 230 increases.

The plurality of light guide portions 250 may include a first light guide portion disposed to connect between a first light source and a second light source of the plurality of light sources 230, and a second light guide portion disposed to connect between a third light source and a fourth light source of the plurality of light sources 230, and the first light guide portion and the second light guide portion may intersect.

The second reflective layer 242 may be positioned in a region where the first light guide portion and the second light guide portion intersect.

A portion of the second reflective layer 242 may be positioned outside the region where the first light guide portion and the second light guide portion intersect.

A thickness of the region where the first light guide portion and the second light guide portion intersect may be greater than a thickness of the first light guide portion or the second light guide portion.

Alternatively or additionally, the plurality of light guide portions 250 may not intersect.

A portion of each of the plurality of light guide portions 250 may be disposed on an upper surface of one of the plurality of light sources 230.

The display device 100 may further include a light source protection portion 260 which is disposed on the plurality of light sources 230 and the plurality of light guide portions 250 and which has a refractive index that is smaller than that of each of the plurality of light guide portions 250.

A portion of the light source protection portion 260 may be positioned in a region surrounded by the plurality of light guide portions 250.

The light source protection portion 260 may be spaced apart from the side portion of each of the plurality of light sources 230 by the plurality of light guide portions 250.

The light source protection portion 260 may be in contact with an upper surface of each of the plurality of light sources 230.

The first reflective layer 241 may have a specular reflection characteristic, and the second reflective layer 242 may have a diffuse reflection characteristic.

Some of light emitted from the plurality of light sources 230 may pass through the reflective pattern 232.

The backlight unit according to the embodiments of the present disclosure may include the plurality of light sources 230 on the substrate 220, the first light guide layer which is disposed to connect two adjacent light sources 230 among the plurality of light sources 230 on the substrate 220, which includes a plurality of openings OA, and which has a first refractive index, and the second light guide layer which is disposed on the plurality of light sources 230 and the first light guide layer, which fills the plurality of openings OA, and which has a second refractive index that is smaller than the first refractive index.

The backlight unit may further include the first reflective layer 241 disposed on the substrate 220 and disposed in a region where the first light guide layer and the second light guide layer overlap.

The backlight unit may further include a second reflective layer 242 disposed on the first reflective layer 241 and disposed in a region where a first portion disposed in one direction of the first light guide layer intersects a second portion disposed in a direction intersecting the one direction.

The backlight unit according to the embodiments of the present disclosure may include the plurality of light sources 230 disposed on the substrate 220, the light guide layer which is disposed on the substrate 220, which includes a plurality of openings OA, and which includes a first portion disposed in one direction and a second portion disposed in a direction intersecting the one direction, and a plurality of reflective layers disposed in some regions between the substrate 220 and the light guide layer. Each of the plurality of light sources 230 and each of the plurality of reflective layers may be positioned in a region where the first portion and the second portion intersect and may be alternately disposed.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles described herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a display panel; and
a backlight unit, the backlight unit including:
  a substrate;
  a light emitting structure over the substrate;
  a first light reflective structure over the light emitting structure;
  a second light reflective structure over the substrate and extending laterally with respect to the light emitting structure; and
  a light guide structure over a first region of the second light reflective structure and extending laterally with respect to the light emitting structure, a second region of the second light reflective structure adjacent to the first region being exposed from the light guide structure,
  wherein the second light reflective structure includes a plurality of light reflective layers, the plurality of light reflective layers including a first light reflective layer and one or more second light reflective layers each stacked on the first light reflective layer, each second light reflective layer of the one or more second light reflective layers having a smaller area than the first light reflective layer,
  wherein a reflectance value of a second light reflective layer of the one or more second light reflective layers decreases from a central portion to an edge portion of the second light reflective layer.

2. The display device of claim 1, wherein a second light reflective layer of the one or more second reflective layers includes a circular shape.

3. The display device of claim 1, wherein the one or more second light reflective layers are each further away from the light emitting structure than the first light reflective layer in a lateral direction.

4. The display device of claim 1, wherein the first reflective layer includes a specular reflection characteristic, and the one or more second reflection layers each includes a diffused reflection characteristic.

5. The display device of claim 1, wherein the light guide structure includes a first surface distal from the substrate, the first surface having an inclined shape with a first portion higher than a second portion, the first portion closer to the light emitting structure than the second portion.

6. The display device of claim 1, wherein:
the light emitting structure includes a first light emitting structure and a second light emitting structure;
the light guide structure connects between the first light emitting structure and the second light emitting structure; and
a second light reflective layer of the one or more second light reflective layers is between the first light emitting structure and the second light emitting structure and spaced away from each of the first light emitting structure and the second light emitting structure.

7. The display device of claim 1, wherein:
the light emitting structure includes a first light emitting structure, a second light emitting structure, a third light emitting structure, and a fourth light emitting structure;
the light guide structure includes a first light guide portion and a second light guide portion, the first light guide portion connecting between the first light emitting structure and the second light emitting structure, the second light guide portion connecting between the third light emitting structure and the fourth light emitting structure, and the first light guide portion and the second light guide portion intersecting with one another at an intersection portion; and
a second light reflective layer of the one or more second light reflective layers overlaps with the intersection portion.

8. The display device of claim 1, wherein:
the light guide structure includes a first surface distal from the substrate;

the first surface includes a bump-up portion; and
the bump-up portion overlaps with the second reflective layer.

9. The display device of claim 1, wherein the light guide structure is on the first light reflective structure.

10. The display device of claim 9, wherein the light guide structure encapsulates the first light reflective structure.

11. A display device, comprising:
a display panel; and
a backlight unit, the backlight unit including:
  a substrate;
  a light emitting structure over the substrate;
  a first light reflective structure over the light emitting structure;
  a second light reflective structure over the substrate and extending laterally with respect to the light emitting structure; and
  a light guide structure over a first region of the second light reflective structure and extending laterally with respect to the light emitting structure, a second region of the second light reflective structure adjacent to the first region being exposed from the light guide structure,
wherein the light emit-emitting structure includes:
  a light emitting portion having a first side and a second side opposite to one another;
  a support portion on the first side of the light emitting portion; and
  an electrode pad on the second side of the light emitting portion,
  wherein the first light reflective structure is on the support portion, the support portion between the first reflective structure and the light emitting portion, and
wherein the second light reflective structure includes a light reflectance greater than that of the first light reflective structure.

12. A backlight unit comprising:
a substrate;
a light emitting structure over the substrate;
a first light reflective structure over the light emitting structure;
a second light reflective structure over the substrate and extending laterally with respect to the light emitting structure; and
a light guide structure over a first region of the second light reflective structure and extending laterally with respect to the light emitting structure, a second region of the second light reflective structure adjacent to the first region being exposed from the light guide structure,
wherein the second light reflective structure includes a plurality of light reflective layers, the plurality of light reflective layers including a first light reflective layer and one or more second light reflective layers each stacked on the first light reflective layer, each second light reflective layer of the one or more second light reflective layers having a smaller area than the first light reflective layer,
wherein a reflectance value of a second light reflective layer of the one or more second light reflective layers decreases from a central portion to an edge portion of the second light reflective layer.

* * * * *